United States Patent [19]
Schnorr

[11] Patent Number: 4,995,082
[45] Date of Patent: Feb. 19, 1991

[54] METHOD FOR IDENTIFYING SUBSCRIBERS AND FOR GENERATING AND VERIFYING ELECTRONIC SIGNATURES IN A DATA EXCHANGE SYSTEM

[76] Inventor: Claus P. Schnorr, Frankfurterstr. 81, 6350 Bad Nauheim, Fed. Rep. of Germany

[21] Appl. No.: 484,127

[22] Filed: Feb. 23, 1990

[30] Foreign Application Priority Data

Feb. 24, 1989 [EP] European Pat. Off. ........ 89103290.6

[51] Int. Cl.$^5$ .............................................. H04K 1/00
[52] U.S. Cl. ........................................ 380/23; 380/30; 380/25; 380/46
[58] Field of Search ................. 380/28, 30, 25, 46, 380/23

[56] References Cited

U.S. PATENT DOCUMENTS

| | | | |
|---|---|---|---|
| 4,225,935 | 9/1980 | Zscheile et al. | 380/28 |
| 4,351,982 | 9/1982 | Miller et al. | 380/30 |
| 4,405,828 | 9/1983 | Rivest et al. | 380/30 |
| 4,514,592 | 4/1985 | Miyaguchi | 380/28 |
| 4,658,094 | 4/1987 | Clark | 380/30 |
| 4,748,668 | 5/1988 | Shamir et al. | 380/28 |
| 4,759,063 | 7/1988 | Chaum | 380/28 |
| 4,759,064 | 7/1988 | Chaum | 380/28 |
| 4,876,716 | 10/1989 | Okamoto | 380/30 |

OTHER PUBLICATIONS

Omura, J. K., "A Computer Dial Access System Based on Public-Key Techniques", I.E.E.E., Communcations, vol. 25, No. 7, 1987, pp. 73-79.
Beth, T., "Efficient Zero-Knowledge Identification Scheme for Smart Cards", Advances in Cryptology--Eurocrypt, '80, pp. 77-84.

Primary Examiner—Thomas H. Tarcza
Assistant Examiner—David Cain
Attorney, Agent, or Firm—Hill, Van Santen, Steadman & Simpson

[57] ABSTRACT

In a data exchange system working with processor chip cards, a chip card transmits coded identification data I, v and, proceeding from a random, discrete logarithm r, an exponential value $x = 2^r \pmod{p}$ to the subscriber who, in turn, generates and transmits a random bit sequence e to the chip card. By multiplication of a stored, private key s with the bit sequence e and by addition of the random number r, the chip card calculates a y value and transmits the y value to the subscriber who, in turn, calculates an x value from the information y, $v_j$ and e and checks whether the calculated x value coincides with the transmitted x value. For an electronic signature, a hash value e is first calculated from an x value and from the message m to be signed and a y value is subsequently calculated from the information r, $s_j$ and e. The numbers x and y then yield the electronic signature of the message m.

11 Claims, 3 Drawing Sheets $l, v, m, e, y$

CHECK $l, v$

CALCULATE $\bar{x} := 2^y \prod_{j=1}^{k} v_j^{\sum_{i=1}^{t} e_{i,j} 2^{i-1}} \pmod{p}$ CALCULATE $\bar{e} := h(\bar{x}, m)$ CHECK WHETHER $e = \bar{e}$ $p, l, h, s, v$ SELECT $r$ CALCULATE $x := 2^r \pmod{p}$ $m$ CALCULATE $e := h(x, m)$ CALCULATE $y := r + \sum_{j=1}^{k} s_j \sum_{i=1}^{t} e_{i,j} 2^{i-1} \pmod{p-1}$.

METHOD FOR IDENTIFYING SUBSCRIBERS AND FOR GENERATING AND VERIFYING ELECTRONIC SIGNATURES IN A DATA EXCHANGE SYSTEM

BACKGROUND OF THE INVENTION

1. Field of the Invention

The present invention relates to a method for identifying subscribers and for generating and verifying electronic signatures in a data exchange system working with processor chip cards, using identification data coded in a center with respective subscriber-related known ciphers and stored in the respective chip card and with secret ciphers having a logical relationship to the known ciphers, whereby random number-dependent check data are mutually exchanged between the subscribers.

2. Description of the Prior Art

Important prerequisites for data security in modern communication systems are:

(a) the mutual identification of the communicating partners participating in the system;

(b) the authentication of the transmitted and stored data;

(c) the coding of the transmitted and stored data; and (d) checking the authorship of the transmitted data.

As is known, a high degree of data security can only be achieved by utilizing cryptographic methods that enable an identification and authenticity check of messages, subscribers and equipment beyond all doubt. What is generally understood by cryptography is a coding of the data for secrecy purposes. In addition to this doubtlessly-important crypto function, however, other functions, particularly checking the authenticity and authorship or generating electronic signatures are gaining increasing significance.

Symmetrical or asymmetrical coding algorithms can be employed for realizing cryptographic functions. Given a symmetrical algorithm, for example the DES algorithm (data incryption standard), identical keys are employed for coding and decoding. Symmetrical cryptosystems are particularly suitable when larger data sets have to be transmitted at a high rate. By contrast, disadvantages derive due to a relatively difficult cryptomanagement because the transmitter and the receiver must have the same key and a reliable channel is required for the transmission of the key respectively employed.

In asymmetrical cryptosystems, different ciphers are employed for coding and decoding, such that, for example, the key for coding is known and the key for decoding is secret. The latter is only known to the receiver. On asymmetrical cryptosystems, for example, the RSA algorithm named after the inventors Rivest Shamir and Adlemann that requires a comparatively high technological outlay and correspondingly long run times dependent on the length of the cipher employed but that satisfies high security requirements on the basis of the special cryptosystem. The asymmetrical cryptosystem is ideally suited for assigning a message to be transmitted. The message to be signed is thereby coded with the secret key of the signee and can be decoded by anyone that knows the public key. This "electronic signature" not only contains the personal feature (possession of private or secret key of the signee but also involves the signed text, with the consequence that the receiver recognizes any change in the text. Message and signature are therefore invariably linked via the key algorithm.

The utilization of modern cryptographic equipment is intimately connected to the introduction as what are referred to as multi-functional processor chip cards. The processor chip card not only enables versatile applications but is also employed for accepting the necessary security components (secret key and cryptoalgorithm) in order to guarantee an identification of the user and a reliable authentication of the card and of the message exchanged.

Presently known algorithms for electronic signatures, particularly the RSA algorithm (in this connection see U.S. Pat. No. 4,405,829), fully incorporated herein by this reference or the algorithm developed by A. Fiat and A. Shamir (European patent application Ser. No. 0,252,499) require either a high memory outlay or, insofar as they can be accommodated at all in the chip because of extensive and complicated arithmetic operations, particularly, multiplications, require a great deal of time, so that they are only conditionally suitable for utilization in chip cards.

SUMMARY OF THE INVENTION

It is therefore an object of the invention to provide methods for mutual identification of subscribers of data exchange systems and for generating signatures that, given essentially the same security guarantees, enable shorter run times due to more simple arithmetic operations, in comparison to known cryptographic methods.

The above object is achieved, according to the present invention, in a method for mutual identification of subscribers in a data exchange system working with processor chip cards, utilizing identification data coded in a center with respective subscriber-related known keys and stored in the respective chip card and with secret keys having a logical relationship to these known keys, whereby random number-dependent check data are mutually exchanged between the subscribers, and is particularly characterized in that the chip card sends the coded identification data, potentially together with a signature of the center, to the subscribers entering into an information exchange with the chip card, this subscriber checking the correctness of the coded identification data with reference to a known list or with reference to the signature of the center, then proceeding from a random, discrete algorithm $r \epsilon (1, \ldots, p-1)$, where p is a declared prime number modulus, the chip card forms an x value according to the rule $x := 2^r \pmod{p}$ and sends this x value to the subscriber, after which the subscriber sends a random bit sequence $e = (e_{l,x l}, \ldots, e_{tx,k}) \epsilon \{0,1\}^{kt}$ to the chip card, and by multiplication of the stored secret key $s_j$ that likewise represents a discrete logarithm with a binary number formed from the bits of the random bit sequence e transmitted from the subscriber to the chip card and by addition of the random number r allocated to the previously-transmitted x value, the chip card calculates a number y according to the rule $$y := r + \sum_{j=1}^{k} s_j \sum_{i=1}^{t} e_{i,j} 2^{i-1} \quad \pmod{p-1}$$

and transmits the number y to the subscriber, then with reference to the number y transmitted to the subscriber, the subscriber calculates a number x according to the rule $$x = 2^y \prod_{j=1}^{k} v_j \sum_{i=1}^{t} e_{i,j} 2^{i-1} \pmod{p}$$

and checks the identity of the chip card user on the basis of a comparison between the calculated number x and the x value previously communicated to the subscriber.

According to another feature of the invention, the method is particularly characterized in that the chip card calculates a x value according to the rule $x := 2^r \pmod{p}$ from a random number r generated in the chip card and lying in the range between 1 and the prime number modulus (p−1), that the chip card calculates a random bit sequence as a function of the x value of the message m and of a declared hash function h according to the rule $e := h(x, m) \in \{0,1\}^{kt}$, that the chip card calculates a y value from the random number r, from the secret ciphers $s_j$ stored in the chip card and from the random bit sequence e according to the rule $$y := r + \sum_{j=1}^{k} s_j \sum_{i=1}^{t} e_{i,j} 2^{i-1} \pmod{p-1}$$

and that the chip card sends the message m and the signature formed from the value x and y to the subscriber in message communication with the chip card.

According to another feature of the invention methods can be accelerated by discrete logarithms calculated in a preliminary process and intermediately stored, whereby values once employed are combined in a random fashion with other discrete logarithms in a rejuvenation process. This is exemplified by a method of the type set forth above which is particularly characterized in that a plurality of random numbers r, and respectively appertaining x values calculated in a preliminary process are stored in pairs in the chip card, in that the pair (r, x) employed in an identification procedure and/or signature procedure is varied in such a manner that a random number r, after use thereof, is combined with a random selection of the remaining stored random numbers, and in that the rejuvenated random number calculates the appertaining x value and is stored and/or used together with the rejuvenated random number r as a rejuvenated pair.

A method for verification of a signature generated according to the second-mentioned feature is particularly characterized, with respect to the subscriber receiving the signed message m, in that:

a random bit sequence e is calculated from the message m and from the x value of the signature according to the rule $e := h(x, m) \in \{0,1\}^{kt}$, that an x value according to the rule $$\bar{x} = 2^y \prod_{j=1}^{k} v_j \sum_{i=1}^{t} e_{i,j} 2^{i-1} \pmod{p}$$

is calculated from the random bit sequence e, from the public key v and from the y value of the signature and is checked to see whether the calculated $\bar{x}$ value coincides with the x value of the signature.

With respect to rejuvenation, according to another feature of the invention, a method is particularly characterized in that a plurality of random numbers $r_l, \ldots, r_k$ and their appertaining x values, $x_v = 2^{r_v} \pmod{p}$, are stored in the chip card, and in that the pair of numbers (r, x) used in an identification procedure and/or signature procedure is rejuvenated in the following manner by a random selection $(r_{a(i)}, x_{a(i)})$ of the pairs for $i = 1, \ldots, t$ $$r_v^{new} := r_v^{old} + \sum_{i=1}^{t} r_{a(i)} 2^i \pmod{p-1}$$

$$x_v^{new} := x_v^{old} \prod_{i=1}^{t} x_{a(i)}^{2^i} \pmod{p}$$

According to another feature of the invention, a method is particularly characterized by such a selection of the prime number modulus p that (p−1) is divisible by a prime number q and by such a selection of the base α of the discrete logarithm that $$\alpha^q = 1 (mod\ p),\ \alpha \neq 1 (mod\ p)$$

applies, and in that the discrete logarithms y, r, $s_j$ are calculated modulo q, and in that the key components $s_j$ and $v_j$ are in the relationship $v_j = \alpha^{s_j} \pmod{p}$. Then α plays the role of the base 2 above.

According to another feature of the invention, a method is particularly characterized by such a selection of the secret key $s_j$ and of the random numbers r that the bit lengths of the numbers $s_j$, r and y are shorter than the length of the prime number modulus p.

According to another feature of the invention, a method is particularly characterized in that other finite groups are employed for the formation of discrete logarithm instead of the finite groups that arise on the basis of residual class formation modulo p.

According to another feature of the invention, a method is particularly characterized in that a group of units $Z_n^*$ of the invertible residue classes modula a composite number n, a group of units of a finite body, an elliptical curve over a finite field or the like are provided as a finite group. Then this finite group plays the role of the group $Z_p^*$.

According to another feature of the invention, a method for verifying an abbreviated signature generated according to the third-mentioned feature at the subscriber receiving the signed message m, is particularly characterized in that:

a number $\bar{x}$ is calculated from the transmitted message m and from the signature (e, y) according to the rule $$x = 2^y \prod_{j=1}^{k} v_j \sum_{i=1}^{t} e_{i,j} 2^{i-1}, \pmod{p}$$

and that a check is carried out to see whether the e value of the signature coincides with the value $h(\bar{x}, m)$.

The problem to be solved in practicing the present invention is comprised in the difficulty of calculating the discrete logarithm. Other, known asymmetrical cryptomethods are also constructed on this foundation (for example reference may be taken to T. ElGamal, "A Public Key Cryptosystem and a Signature Scheme Based on Discrete Logarithms", IEEE Transactions on Information Theory, Vol. 31, 1985, pp. 469–472; D. Chaum, J. H. Evertse, J. van de Graaf, "An Improved Protocol for Demonstrating Possession of Discrete Logarithms and some Generalizations", Proceedings of Eurocrypt '87, Lecture Notes in Computer Science 304, (1988), pp. 127–141; T. Beth, "A Fiat-Shamir-like Authentication Protocol for the ELGAMAL Scheme", Eurocrypt '88 Abstracts, pp. 41–47). Compared to the known cryptomethods, the present invention has the advantage that the arithmetic operations can be comparatively more simply executed in the chip card. This occurs particularly due to the set preliminary process. This preliminary process can also be combined with the mentioned cryptosystems of ELGAMAL, CHAUM-EVERTSE-van de GRAAF and BETH. In addition, especially short signatures can be generated in practicing the present invention.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
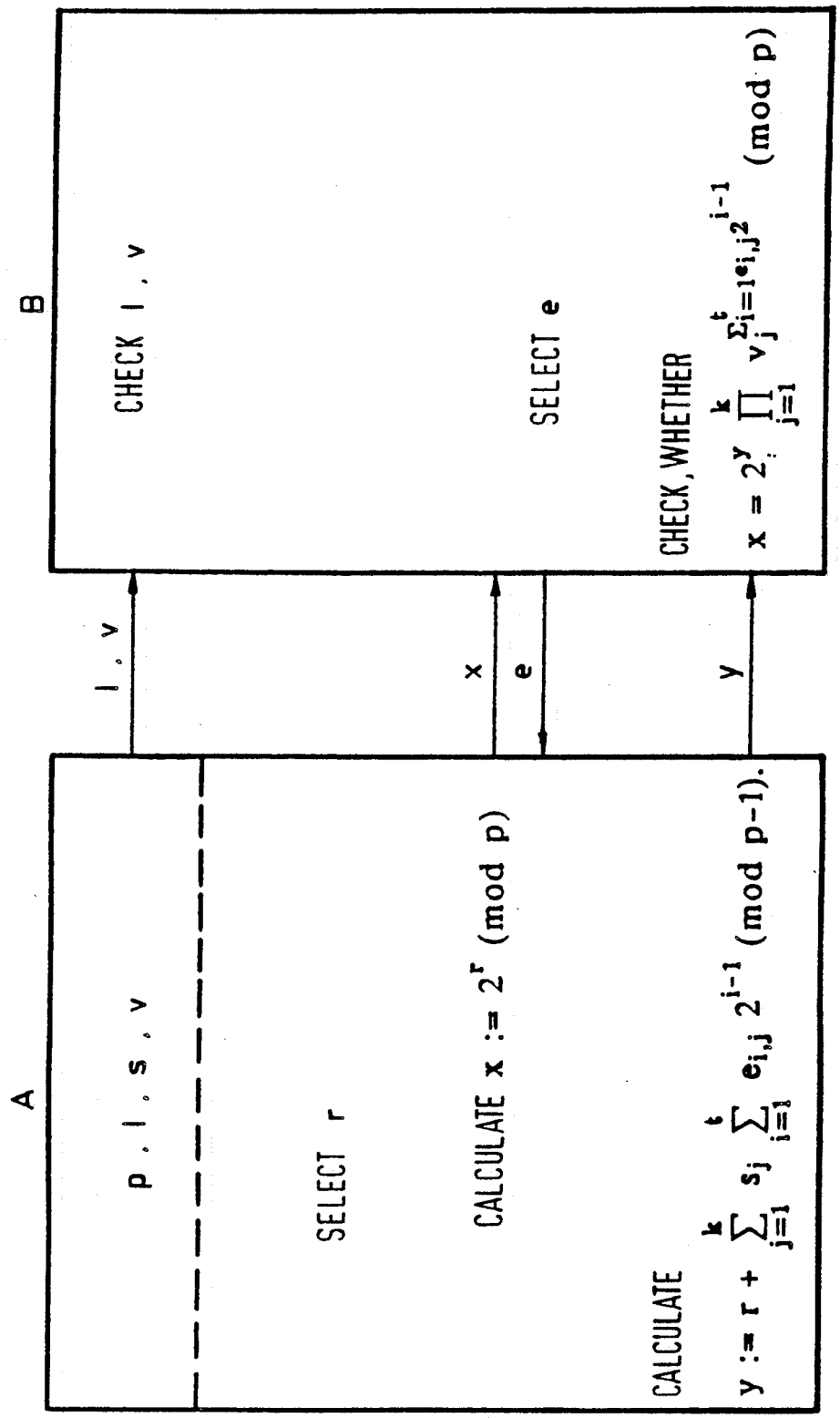
FIG. 1 is a block diagram of the identification of a subscriber in accordance with the present invention.

In FIG. 1, an example is illustrated how a subscriber A, for example a chip card belonging to the subscriber, proves his identity vis-a-vis a subscriber B, for example a chip card terminal.

In a data exchange system working with chip cards, the respective user-related chip cards are issued by one or, potentially, more classification centers (government representatives, credit card companies or the like), whereby the issue of the chip cards is not instituted until the identity of the respective user has been checked. The center then prepares a personal identification string I for a qualified user (name, address, ID number, etc), attaches the user-related, public key to this identification string I, this key having potentially been generated by the user himself, and publishes the pair formed of identification string I and the public key v in a publically-accessible list. The center itself does not see the secret key s and can therefore likewise not disclose the same. The identification string I, the public and secret keys v, s as well as a declared prime number p are stored in the chip card before the card is issued.

Instead of using a public list, the center can sign each pair (I,v). This signature is stored in the chip card and can be easily checked with the assistance of the public key of the center. After the chip cards and/or the public list have been issued, no further interaction with the center is necessary, neither for generating nor for checking signatures and identifications.

The identification begins with what is referred to as an initiation. The subscriber A or, respectively, the chip card thereby sends an identification string I and the public key v to the subscriber B or, respectively, to the appertaining terminal that verifies the identity. Differing from known cryptomethods, the public key is verified in the terminal, i.e. the terminal checks the relationship between the public key v and the identification string I and monitors the signature of the center in this manner. The public key $v=(v_1 \ldots v_k)$ has a logical relationship to the secret key $s=(s_1 \ldots s_k)$ and is defined as $$v_j = 2^{-s_j}(\bmod\ p)\ \text{for}\ j=1,\ldots,k.$$

where p is a prime number that is at least 512 bits long. As soon as the secret key s is selected, the corresponding public key v can be easily calculated. The inverse process—calculating the secret key s from the public key v-13 cannot be implemented because the calculation of the discrete logarithm modulo p for such large prime numbers p is beyond the range of present computers and algorithms. The component $s_j$ of the secret cipher is the discrete logarithm modulo p of $f_j^{-1}$, i.e.

$$s_j = -\log_2 v_j(\bmod\ p-1)\ \text{for}\ j=1,\ldots,k.$$

All discrete logarithms refer to the group $ZZ^*_p$ (the multiplicative group modulo p) and, insofar as not otherwise noted, to the base 2. Since the order of the group $Z_p^*$ is $p-1$, the discrete algorithm assumes the value 1, 2, ... $p-1$. Instead of the finite groups that arise due to residual formation modulo p, other finite groups can also be employed for the formation of the discrete logarithm, such as, for example, the group of $Z_n^*$ of invertible residue classes relative to a composite number n, the group of units of a finite field, an elliptic curve over a finite field, etc. Knowledge of the group order is not required for transferring the method to an arbitrary finite group. For example, it is adequate to calculate with the discrete logarithms on the order of magnitude of $2^{140}$.

After the initiation, the subscriber A generates in record step a random number $$r \in (1,\ldots,p-1),$$

with the corresponding exponential value $$x := 2^r (\bmod\ p).$$

The inverse arithmetic process, i.e. calculating the random number r from the x value is extremely difficult insofar as p is adequately large. The subscriber B therefore has practically no possibility of discovering the random number r in the time available to him. This x value calculated at the subscriber A is transmitted to the subscriber B, i.e. to the terminal. Like the aforementioned secret key $s_j$, the random number r is a discrete logarithm. Following therefrom is that calculations at the side of the chip card are carried out with discrete logarithms and are carried out with the corresponding exponential value at the cooperating side, i.e. in the terminal of the subscriber B.

Generating the random number r and the exponential value $$x := 2^r (\bmod\ p)$$

derived therefrom can be advantageously accelerated by a preliminary process that offers and regenerates a supply of a plurality of pairs each composed of a random number r and the appertaining x value in the chip card. This supply can be set up in the chip card itself or can be externally loaded into the chip card. In an initiated identification process, one of these pairs can therefore be immediately accessed, so that the respective x value can be immediately transmitted to the subscriber B.

In the next step, the subscriber B now sends a random bit sequence $$e = (e_{l,1}, \ldots, e_{t,k}) \in \{0,1\}^{kt}$$

to the subscriber A or, respectively, to the chip card.

After receiving the random bit sequence e, the chip card sends a linear combination of the secret key $s_j$ stored therein—a linear combination dependent on the bits of a random bit sequence e—, adds the current random number r thereto and transmits the numerical value y $$y: = r + \sum_{j=1}^{k} s_j \sum_{i=1}^{t} e_{i,j} 2^{i-1} \quad \text{(mod p-1)}$$

formed in this manner to the subscriber B.

The subscriber B now checks whether the y value sent to him is the correct answer to the question raised, the subscriber A having been asked this question by the subscriber B sending the random bit sequence e. In this check, the subscriber B calculates the right-hand part of the following equation.

$$x = 2^y \prod_{j=1}^{k} v_j \sum_{i=1}^{t} e_{i,j} 2^{i-1} \quad \text{(mod p)}$$

and determines with reference to a comparison whether the calculated numerical value $\bar{x}$ coincides with the x value already previously received from the subscriber A. This task to be carried out at the subscriber B is, in fact, relatively involved; because of the adequate computer performance usually present in the terminal, it can be carried out in a relatively short time. The identification check is therefore terminated, so that the subscriber A can initiate further measures insofar as the subscriber B identified a coincidence of the two x values.

Figure 2:
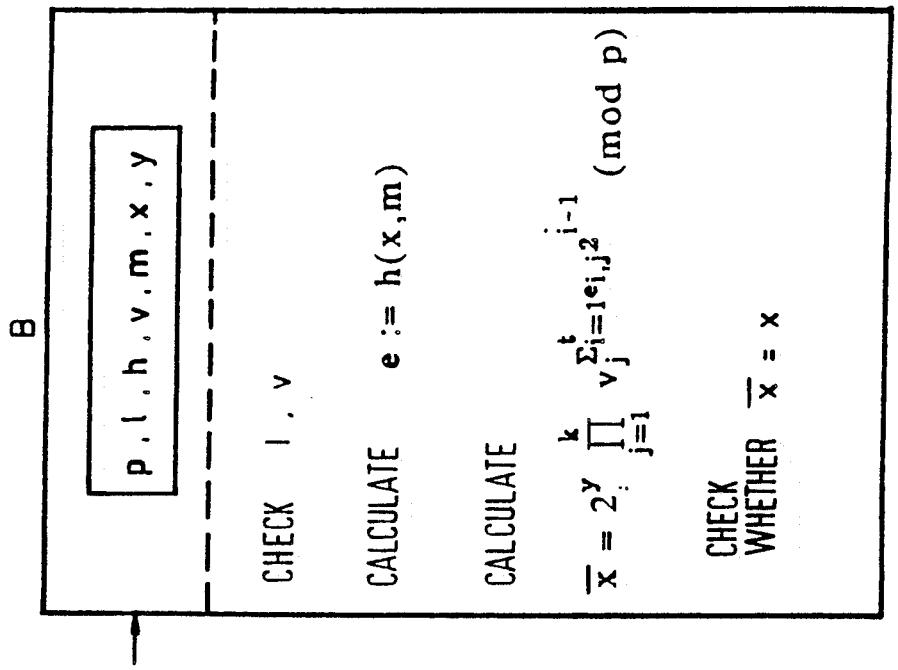
FIG. 2 is an illustration of the method steps of the invention in the generating of a signature of a message to be transmitted.

By incorporating a message m, the described identification of the subscriber A can be expanded into an electronically-generated signature of the subscriber A under the message m. This electronic signature allows the subscriber B to document the identity of the subscriber A vis-a-vis a third party, for example a judge. In addition to this, it allows the proof that the subscriber A has signed the message m beyond all doubt. The following steps must be carried out (see FIG. 2) in order to sign a message m given utilization of the secret key $s_j$ stored at the subscriber A, i.e. in the chip card:

1. The subscriber A again selects a random number r and, as already set forth in conjunction with the identity check, calculates a x value according to the relationship $$x: = 2^r (\text{mod } p).$$

Here also, of course, there is the possibility of accessing the stored supply and directly calling in the random numbers r and the appertaining x value.

2. The subscriber A now forms a hash value e from the message m and from the calculated x value or, respectively, from the x value taken from the supply, according to the relationship $$e: = h(x,m) \in \{0,1\}^{kt}$$

where h is thereby a publicly known hash function having values in $\{0,1\}^{kt}$.

3. Finally, the subscriber A calculates a y value from the components of the secret key $s_j$, random bit sequence or, respectively, hash value e and random number r according to the relationship $$y: = r + \sum_{j=1}^{k} s_j \sum_{i=1}^{t} e_{i,j} 2^{i-1}. \quad \text{(mod p-1)}$$

The number pair x, y then yields what is referred to as the electronic signature of the message m. The two security numbers k and t preferably lie in the range between 1 and 20. They yield a security level $2^{kt}$, i.e. at least $2^{kt}$ multiplications (modulo p) are needed for counterfeiting the signature or, respectively, the identity. For example, k=1 and t=72 yields a security level $2^{72}$ that is adequate for signatures.

Figure 4:
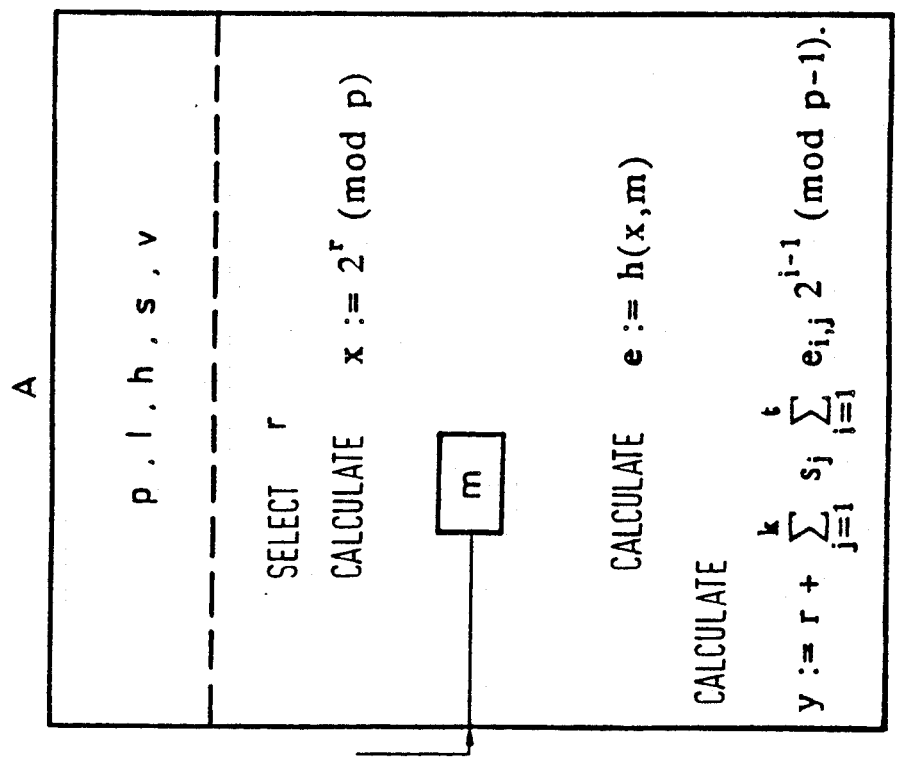
FIG. 4 is a diagram of the method steps of the present invention in generating an abbreviated signature.

Proceeding on the basis of this signature formed by the number x and y, whereby both numbers are at least 512 bits long, various possibilities of abbreviating the signature derive. One of the possibilities provides that the number x be replaced by the hash value e=h(x, m) that is only 72 bits long. The signature is now composed of only y and e values (see FIG. 4). A next step is comprised in no longer taking the numbers y, r, $s_j$ in the size of the modulo p, but of only small numbers for y, r, $s_j$ that, however, are at least 140 bits long for the security level $2^{72}$. An especially simple possibility of achieving short signatures is comprised therein that the prime number modulus p is selected such that a second prime number q divides the value (p−1), whereby q is 140 bits long. The base 2 is then replaced by a number $\alpha$, so that $$\alpha^q = 1 (\text{mod } p), \alpha \neq 1 (\text{mod } p)$$

applies. It follows therefrom that all discrete logarithms can be calculated modulo q, i.e. logarithms for the selected number $\alpha$ are calculated, whereby all logarithms can then lie in the range from 1 through q. This has the advantage that a number that is smaller than q derives for the y value of the signature. Proceeding from the random number r $$r \in \{1, \ldots, q-1\},$$

from $$x: = \alpha^r (\text{mod } p)$$

calculated therefrom as well as from the arbitrary bit sequence $$e: = h(x,m) \in \{0,1\}^{kt}$$

and from the number y $$y: = r + \sum_{j=1}^{k} s_j \sum_{i=1}^{t} e_{i,j} 2^{i-1} \quad \text{(mod q)}$$

calculated therefrom, a total length of 212 bits now derives from the signature formed from the numbers y and e with y=140 bits and e=72 bits. A signature abbreviated in this manner has the security level of $2^{72}$, i.e. approximately multiplications modulo p are required in order to counterfeit a signature.

Figure 3:
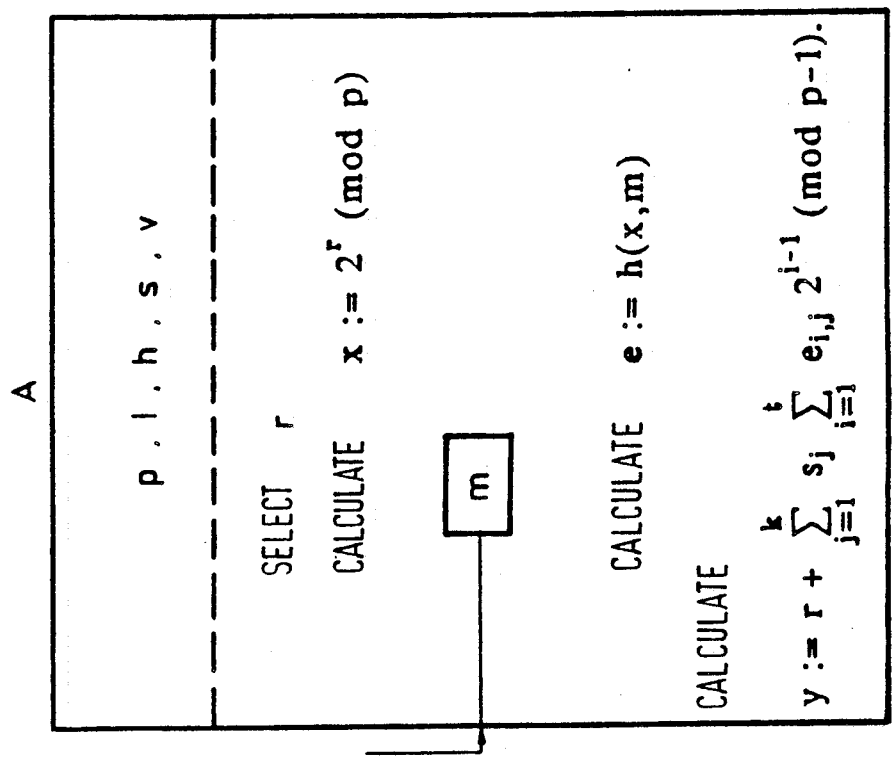
FIG. 3 is a diagram of the steps for checking a signature generated according to FIG. 2.

The following steps are performed by the subscriber B, i.e. in the terminal for verification of a signature composed of the numbers x and y. First, as shown in FIG. 3, $$e := h(x, m) \in \{0,1\}^{kt}$$

is calculated and the equality test is then implemented such that the $\bar{x}$ value calculated according to the equation $$x = 2^y \prod_{j=1}^{k} v_j \sum_{i=1}^{t} e_{i,j} 2^{i-1} \quad (\mod p)$$

is compared to the x value of the signature.

Figure 5:
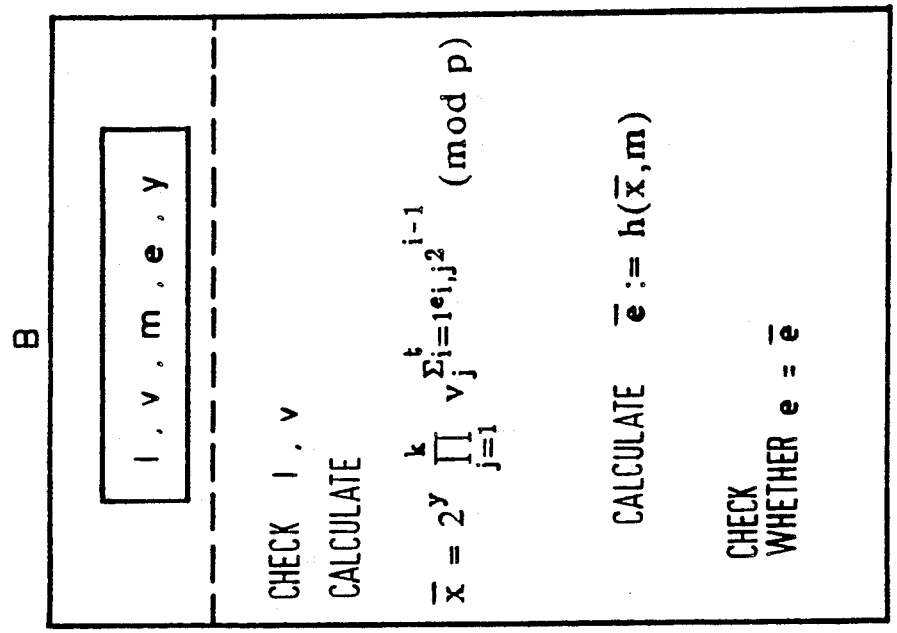
FIG. 5 is a diagram of the steps used in the checking of the abbreviated signature generated according to FIG. 4.

Given abbreviated signatures in which x is replaced by e, the verification according to FIG. 5 occurs in such a fashion that $$x = 2^y \prod_{j=1}^{k} v_j \sum_{i=1}^{t} e_{i,j} 2^{i-1} \quad (\mod p)$$

is first calculated and a check is then carried out to see whether the number $\bar{x}$ supplies the correct e value. The latter occurs in that a check is carried out to see whether the hash value $h(\bar{x}, m)$ coincides with the value e.

Only relatively slight calculating tasks must be produced in the chip card both in the identification protocol and the signature protocol. Although the secret key $s_j$ must still be multiplied by relatively small numbers in calculating the number y, this multiplication can be resolved into simple additions and shift events, what are referred to shifts, whereby the product of $s_j$ and $e_{i,j}$ merely has to be shifted i−1 positions toward the left. The random number r, finally, is then to be attached to this intermediate result by addition.

Although the calculation of the number $$x := 2^r \pmod{p}$$

is also involved, it can be practically neglected in terms of time expenditure due to the aforementioned preliminary process when x values corresponding to a few random numbers are calculated in advance and a plurality of pairs of numbers composed of r values and x values are stored as a supply.

In order to prevent having the same number of pairs being used over and over again at regular intervals given a limited plurality of pairs, a rejuvenation is carried out insofar as each pair, after use, is subsequently combined with other, potentially all pairs of the supply, in particular again in a random fashion. The result thereof is that the supply is rejuvenated and varied over and over, little by little.

As an example of such a rejuvenation, let it be assumed that a supply of $\bar{k}$ number pairs $(r_i, x_i)$ is present for $i = 1 \ldots, k$. In order to renew the pair $(r_\nu, x_\nu)$ random indices $a(1), \ldots, a(t-1) \in \{1, \ldots, k\}$, for example, are selected, as is a pair $(r_\mu, x_\mu)$ that has just been rejuvenated and the new pair $(r_\nu, x_\nu)$ is calculated with $a(t) = \mu$ according to the rule $$r_\nu^{new} := r_\nu^{old} + \sum_{i=1}^{\bar{t}} r_{a(i)} \quad (\mod p-1)$$

$$x_\nu^{new} := x_\nu^{old} \cdot \prod_{i=1}^{\bar{t}} x_{a(i)}. \quad (\mod p)$$

The relationship $x = 2^{r_\nu} (\mod p)$ again holds true for the new pair $(r_{84}, x_\nu)$. The new number $r_\nu$ can be calculated with t additions and the new number $x_\nu$ can be calculated with $\bar{t}$ multiplication. Another rejuvenation of the pair $(r_\nu, x_\nu)$ is possible according to the rule $$r_\nu^{new} := r_\nu^{old} + \sum_{i=1}^{\bar{t}} r_{a(i)} 2^i \quad (\mod p-1)$$

$$x_\nu^{new} := x_\nu^{old} \cdot \prod_{i=1}^{\bar{t}} x_{a(i)}. \quad (\mod p)$$

The calculation of the new value $r_\nu$ is produced here in t additions and t shifts. The new number $x_\nu$ can be calculated with 2t multiplications. Beginning with $z = 1$, the steps $$z := z x_{a(i)} (\mod p), \quad z := z^2 (\mod p),$$

are implemented for this purpose with the index i descending from t to 1. The new value $x_\nu$ is obtained as a product of the old value with the most-recently calculated number z, i.e. according to the rule $$x_\nu^{new} := x_\nu^{old} z (\mod p).$$

In the rejuvenation, the selection $a(\bar{t}) = \mu$ has the result that a number $r_\mu$ that was just rejuvenated is multiplied by the highest power of 2. This leads to an especially effective rejuvenation of the supply. It is advantageous to employ a pair (r, x) as a signature that is formed as a random combination of the pairs just stored. Intermediate values that arise anyway given the rejuvenation of $r_\nu, x_\nu$ are well suited for this purpose.

Of course, these rejuvenation processes for the pair $(r_\nu, x_\nu)$ can be combined and varied. The only matter of consequence is that the rejuvenation occurs as quickly as possible and cannot be duplicated from the signatures that have been performed. A small number $\bar{t}$ is thereby expediently employed; the rejuvenation cannot be discovered when the supply of numerical pairs—i.e. the number $\bar{k}$—is adequately large. It is advantageous to co-employ the key pairs $s_j, v_j$ in the rejuvenation; for example, a cipher pair $s_j, v_j$ can be selected for a number pair $(r_{a(1)}, x_{a(1)})$. Given $\bar{t} = 6$ and $\bar{k} = 10$, the rejuvenation of a number pair requires only 6 or, respectively, 12 multiplications that can be implemented more or less incidently, for example when no other arithmetic operations are to be executed in the terminal.

The versatile possibilities of rejuvenating the number pairs $(r_\nu, x_\nu)$ can be differently used in each chip card. For example, the indices $a(1), \ldots, a(\bar{t}31\ 1)$ and the combination of the cipher pairs of the supply can be differently fashioned in each chip card. A discovery of the rejuvenation process is practically impossible in this manner.

In the case of the abbreviated signature, the random numbers $r_i$ must be small so that the y part of the signature also remains small. This is achieved in a simple manner in that the base $\alpha$ for which a 140 bit long prime number q is selected for the discrete logarithms, so that $\alpha^q = 1 (\mod p)$ is valid. The rejuvenation of the random numbers $r_i$, of course, is then calculated modulo q, i.e. the modulus p−1 is replaced by the modulus q.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method for mutual identification of subscribers in a data exchange system working with processor chip cards and using identification data coded into the cards by a card-issuing center including subscriber-related public keys and stored in the respective chip cards along with private keys which have a logical relationship to the public keys, whereby random number-dependent check data are exchanged between the subscribers, comprising the steps of:

transmitting from a chip card the coded identification data together with a signature of the center to a subscriber entering into an information exchange with the chip card;

at the subscriber checking the correctness of the coded identification data with reference to known information including a public list or reference to the signature of the center;

forming in the chip card a x value proceeding from a random, discrete logarithm $r\epsilon(1,\ldots,p-1)$, where p is a declared prime number modulus, and according to the rule $$x := 2^r (\bmod\ p);$$

transmitting the x value to the subscriber;

transmitting from the subscriber a random bit sequence $$e = (e_{l,l} \ldots e_{t,k}) \epsilon \{0,1\}^{kt}$$

to the chip card;

multiplying the stored, private key $s_j$ representing a discrete logarithm with a binary number formed from the bits of the random bit sequence e transmitted from the subscriber to the chip card and adding the random number r allocated to the previously-transmitted x value to calculate, at the chip card, a number y according to the rule $$y := r + \sum_{j=1}^{k} s_j \sum_{i=1}^{t} e_{i,j} 2^{i-1} \ (\bmod\ p-1)$$

transmitting the number y to the subscriber;

at the subscriber, calculating a number x with reference to the number y according to the rule $$\bar{x} = 2^y \prod_{j=1}^{k} v_j \sum_{i=1}^{t} e_{i,j} 2^{i-1} \ (\bmod\ p);$$

checking the identity of the chip card user by comparing the calculated number x and the x value previously communicated to the subscriber.

2. A method for generating a signature according to the method of claim 1, wherein:

the step of forming a x value is further defined as generating a random number r within the range of between 1 and the prime number modulus (p−1) and calculating the x value according to the rule $$x := 2^r (\bmod\ p)$$

from the generated random number r;

forming a random bit sequence as a function of the x value of a message m and of a declared hash function h according to the rule $$e := h(x,m) \epsilon \{0,1\}^{kt};$$

calculating a y value from the random number r, from the private cipher $s_j$ stored in the chip card and from the random bit sequence e according to the rule $$y := r + \sum_{j=1}^{k} s_j \sum_{i=1}^{t} e_{i,j} 2^{i-1}; \qquad (\bmod\ p-1)$$

transmitting the message m and the signature formed from the value x and y to the subscriber which is in information exchange with the chip card.

3. A method for generating an abbreviated signature for a message to be transmitted in a data exchange system according to the method of claim 1, and further comprising steps defined as:

at the chip card, generating a random number r lying in the range between 1 and the prime number modulus (p−1);

at the chip card, calculating a x value from the random number r according to the rule $$x := 2^r (\bmod\ p);$$

at the chip card, calculating a random bit sequence e as a function of the x value and of the message according to the rule $$e := h(x,m) \epsilon (0,1)^{kt};$$

at the chip card, calculating a y value from the random number r, from the secret key $s_j$ and from the random bit sequence e according to the rule $$y := r + \sum_{j=1}^{k} s_j \sum_{i=1}^{t} e_{i,j} 2^{i-1}; \qquad (\bmod\ p-1)$$

transmitting from the chip card the message m and the signature formed from the values e and y to the subscriber which is information exchange with the chip card.

4. The method of claim 3, and further comprising the steps of:

generating a plurality of the random numbers r and a plurality of x values and storing the same in pairs in the chip card;

employing one of the pairs of stored random numbers r and x values $(r_v, x_v)$ in an identification procedure and varying the pair in such a manner that a random number r, after use thereof, is combined with a random selection of the remaining, stored random numbers; and calculating the appertaining x value with the rejuvenated random number and storing the same with the rejuvenated random number r as a rejuvenated pair.

5. The method of claim 4, and further defined as comprising:

storing the plurality of random numbers $r_l, \ldots r_k$ and their appertaining $x_v = 2^{r_v} (\bmod\ p)$ in the chip card; and rejuvenating the pair (r, x) used in an identification procedure and/or a signature procedure by random selection $(r_{a(i)}, x_{a(i)})$ of the pairs for $i = 1, \ldots, \bar{t}$ in accordance with $$r_v^{new} := r_v^{old} + \sum_{i=1}^{\bar{t}} r_{a(i)} 2^i \quad (\text{mod } p-1)$$

$$x_v^{new} := x_v^{old} \cdot \prod_{i=1}^{\bar{t}} x_{a(i)}^{2^i}. \quad (\text{mod } p)$$

6. The method of claim 5, and further defined as:
selecting the prime number modulus p such that the number $(p-1)$ is divisible by a prime number q and by such a selection of the base $\alpha$ of a discrete logarithm that $$\alpha^q = 1 \ (mod \ p), \ \alpha \neq 1 \ (\text{mod } p)$$

holds true; and
calculating discrete logarithms $y, r, s_j$ modulo q such that key components $s_j$ and $v_j$ are in the relationship $$v_j = \alpha^{-s_j} (mod \ p).$$

7. The method of claim 6, and further defined as:
selecting the secret key $s_j$ and the random numbers (r) such that the bit lengths of the numbers $s_j$, r and y are shorter than the length of the prime number modulus p.

8. The method of claim 6, and further defined as:
selecting finite groups for the formation of the discrete logarithm instead of the finite groups that arise on the basis of residual class modulo p.

9. The method of claim 8, and further defined as:
selecting one from the groups consisting of the $Z_n^*$, the group of invertible residue classes modulo q composite number r, a group of units of a finite field, and an elliptic curve over a finite field as a finite group.

10. A method for the verification of a signature (x,y) generated according to the method of claim 2 at the subscriber receiving the signed message m, comprising the steps of:
calculating a random bit sequence e from the message m and from the x value of the signature according to the rule $$e := h(x,m) \epsilon \{0,1\}^{kt};$$

calculating an x value according to the rule $$\bar{x} = 2^y \prod_{j=1}^{k} v_j \sum_{i=1}^{t} e_{i,j} 2^{i-1} \quad (\text{mod } p)$$

from the random bit sequence e, from the public cipher v and from the y value of the signature; and
comparing the calculated x value with the x value of the signature.

11. A method for verifying an abbreviated signature generated according to the method of claim 3 at the subscriber receiving the signed message m comprising the steps of:
calculating a number $\bar{x}$ from the transmitted message m and from the signature (e, y) according to the rule $$\bar{x} = 2^y \prod_{j=1}^{k} v_j \sum_{i=1}^{t} e_{i,j} 2^{i-1} \ (\text{mod } p);$$

checking the value e of the signature for coincidence with the value $h(\bar{x}, m)$.

* * * * *